(12) United States Patent
Schmidt

(10) Patent No.: US 9,605,699 B2
(45) Date of Patent: Mar. 28, 2017

(54) METHOD FOR PRODUCING AN ASSEMBLY, AND ASSEMBLY

(71) Applicant: Heiko Schmidt, Lappersdorf (DE)

(72) Inventor: Heiko Schmidt, Lappersdorf (DE)

( * ) Notice: Subject to any disclaimer, the term of this patent is extended or adjusted under 35 U.S.C. 154(b) by 0 days.

(21) Appl. No.: 14/901,779

(22) PCT Filed: Jul. 22, 2014

(86) PCT No.: PCT/DE2014/100267
§ 371 (c)(1),
(2) Date: Dec. 29, 2015

(87) PCT Pub. No.: WO2015/024556
PCT Pub. Date: Feb. 26, 2015

(65) Prior Publication Data
US 2016/0369827 A1    Dec. 22, 2016

(30) Foreign Application Priority Data

Aug. 21, 2013 (DE) .................. 10 2013 109 036

(51) Int. Cl.
| | |
|---|---|
| *F16B 43/02* | (2006.01) |
| *F16B 5/02* | (2006.01) |
| *F16B 33/02* | (2006.01) |
| *F16B 5/04* | (2006.01) |

(52) U.S. Cl.
CPC .............. *F16B 5/0233* (2013.01); *F16B 5/04* (2013.01); *F16B 33/02* (2013.01)

(58) Field of Classification Search
CPC ........ F16B 5/04; F16B 5/0233; F16B 5/0607; F16B 5/0621; F16B 5/0628; F16B 5/0657; F16B 33/02; F16B 37/067; F16B 43/02

USPC ............................. 411/34, 427, 432, 501, 546
See application file for complete search history.

(56) References Cited

U.S. PATENT DOCUMENTS

| | | | | |
|---|---|---|---|---|
| 4,362,449 A | * | 12/1982 | Hlinsky | .................. B60B 3/145 411/156 |
| 5,340,258 A | * | 8/1994 | Simon | ................... F16B 35/005 411/339 |
| 5,492,388 A | * | 2/1996 | Kawasaki | ............ B62D 25/147 296/193.02 |
| 6,585,447 B2 | * | 7/2003 | Schwarzbich | ........ F16B 5/0233 403/299 |
| 7,037,027 B2 | * | 5/2006 | Steinbeck | ............... F16B 5/025 403/296 |

(Continued)

FOREIGN PATENT DOCUMENTS

| | | |
|---|---|---|
| DE | 3620005 C1 | 9/1987 |
| DE | 20119112 U1 | 2/2002 |

(Continued)

OTHER PUBLICATIONS

International Search Report, PCT/DE2014/100267, Jan. 13, 2015.

*Primary Examiner* — Roberta Delisle
(74) *Attorney, Agent, or Firm* — Welsh Flaxman & Gitler LLC

(57) ABSTRACT

The invention relates to the production of an assembly made up of at least two components that are made of, for example, a flat material such as sheet steel and which are clamped together at a predetermined distance using: a clamping nut; a clamping bolt that engages in the clamping nut; and an adjustable spacer formed of a threaded sleeve and a drum nut.

12 Claims, 5 Drawing Sheets

(56) References Cited

U.S. PATENT DOCUMENTS

| | | | |
|---|---|---|---|
| 7,226,263 B2* | 6/2007 | Schwarzbich | F16B 5/0233 403/374.3 |
| 8,066,465 B2* | 11/2011 | Figge | F16B 5/025 411/34 |
| 8,202,033 B2* | 6/2012 | Choi | B62D 25/147 411/535 |
| 8,864,432 B2* | 10/2014 | Figge | F16B 5/025 411/383 |
| 2002/0048499 A1* | 4/2002 | Hoffmann | F16B 37/0864 411/432 |
| 2007/0207012 A1* | 9/2007 | Lorenzo | F16B 5/0233 411/546 |
| 2010/0303582 A1 | 12/2010 | Choi | |
| 2011/0070052 A1* | 3/2011 | Vogel | B21K 1/702 411/427 |

FOREIGN PATENT DOCUMENTS

| | | |
|---|---|---|
| DE | 20313241 U1 | 12/2004 |
| DE | 202007008643 U1 | 9/2007 |
| EP | 1245835 A2 | 10/2002 |

* cited by examiner

METHOD FOR PRODUCING AN ASSEMBLY, AND ASSEMBLY

FIELD OF THE INVENTION

The invention relates to a method for producing an assembly composed of at least two components and the assembly produced by the method. The assembly is composed of at least two components that are produced from a flat material, and are clamped together at a predefined distance (H) from each. The two components are clamped together using a clamping nut that bears against a first component on the outer face thereof that faces away from a second component. The clamping bolt engages in the clamping nut and bears against the second component on the outer face thereof that faces away from the first component. The two components are clamped together further using an adjustable spacer formed by a threaded bushing and a drum nut, and positioned between the two components. Before or while the threaded bolt that passes through the drum nut and the threaded bushing is screwed into the clamping nut, the distance (H) between the components is first set with conjoint rotation of the drum nut and then, as the clamping bolt is further screwed into the clamping nut, the first and second components are clamped against each other.

BACKGROUND OF THE INVENTION

It is often necessary, especially in automotive engineering, to connect or clamp at least two components composed of a flat material, i.e. of sheet steel, for example car body parts, to each other at a predefined distance from each other.

A clamping and fastening device is known for this, which is composed of a clamping nut, which bears against the outside of a first component, a clamping bolt, which bears against the outside of a second component and engages in the clamping nut, and an axially adjustable spacer, which is formed from a threaded bushing, which is supported on the inner face of the first component, and a drum nut, an outer thread of which engages in the inner thread of the threaded bushing and which bears against the inner face of the second component. The drum nut and the threaded bushing have a left-handed thread. The drum nut is connected via a driver bushing to the clamping bolt in order to transmit a limited torque, so that when the clamping bolt is rotated, the conjoint rotation of the drum nut first sets the distance between the components and then, once a required distance has been reached, further increase in the distance between said components and conjoint rotation of the drum nut with the clamping bolt are prevented, and the components are clamped together via the clamping bolt, which increasingly engages in the clamping nut. The disadvantage of the known clamping and fastening device is however that the threaded bushing must be fixed to the first component by hook-like sections that engage in the first component, and moreover the clamping nut must be placed as an individual part onto the clamping bolt that passes through the openings in the components and in the spacer, and must be secured against conjoint rotation with the clamping bolt with a suitable tool during clamping.

SUMMARY OF THE INVENTION

It is an object of the invention to provide a method that makes it possible to fasten and/or clamp together components while avoiding the disadvantages of known clamping and/or fastening devices In a general embodiment of the invention, the method is used to clamp together a first and a second component, which have a predefined distance from each other after being clamped together. In this method, the clamping nut and the threaded bushing of the spacer that determines the distance between the components are fixed to or pre-mounted on the first component, before the second component is mounted or placed thereon. A rivet collar, which is provided on an end face of the clamping nut, is introduced through a joining opening in the first component into the threaded bushing and deformed there into a deformed rivet collar that engages behind an undercut in the threaded bushing, so that the clamping nut and the threaded bushing 5 are fixed on the first component, and against rotation too. Additional means for fixing the threaded bushing or the spacer having the threaded bushing are thereby unnecessary, as are placing the clamping nut onto the clamping bolt and securing the clamping nut with a tool against rotation when the components are clamped together.

In a further embodiment of the method according to the invention, a functional element, preferably in the form of a connection element, is fixed to a joining opening of a component by permanent deformation of a rivet collar in a deformed rivet collar using an additional retaining ring. The rivet collar that passes through the component in the region of the joining opening is also introduced into a ring opening in the retaining ring and deformed there into the rivet collar that engages behind an undercut in the retaining ring. The retaining ring extends with a collar or section into the joining opening. The joining opening has a cross section that is larger than the outer cross section of the collar or section, so that the arrangement formed by the functional element and the retaining ring and fixed to the component can be moved in the joining opening radially to the axis thereof for lateral or radial compensation of tolerances. In order to achieve securing against rotation of the functional element in the joining opening, the latter is formed with a cross section that deviates from the circular shape. The section that extends into the joining opening likewise has a circumferential contour that deviates from the circular shape. A region of the structural element surrounding the joining opening is held between the functional element and the retaining ring.

The expression "substantially", "approximately" or "approx." within the meaning of the invention means deviations from the respectively exact value of +/−10%, preferably of +/−5%, and/or deviations in the form of changes insignificant for the function.

Developments, advantages and applications of the invention can be found in the description of exemplary embodiments below and in the figures. All the features described and/or illustrated fundamentally form the subject matter of the invention alone or in any combination, irrespective of how they are summarised in the claims or how the latter refer to each other.

BRIEF DESCRIPTION OF THE FIGURES

The invention is explained in more detail below using the figures and exemplary embodiments. In the figures.

DETAILED DESCRIPTION OF THE INVENTION

Figure 1:
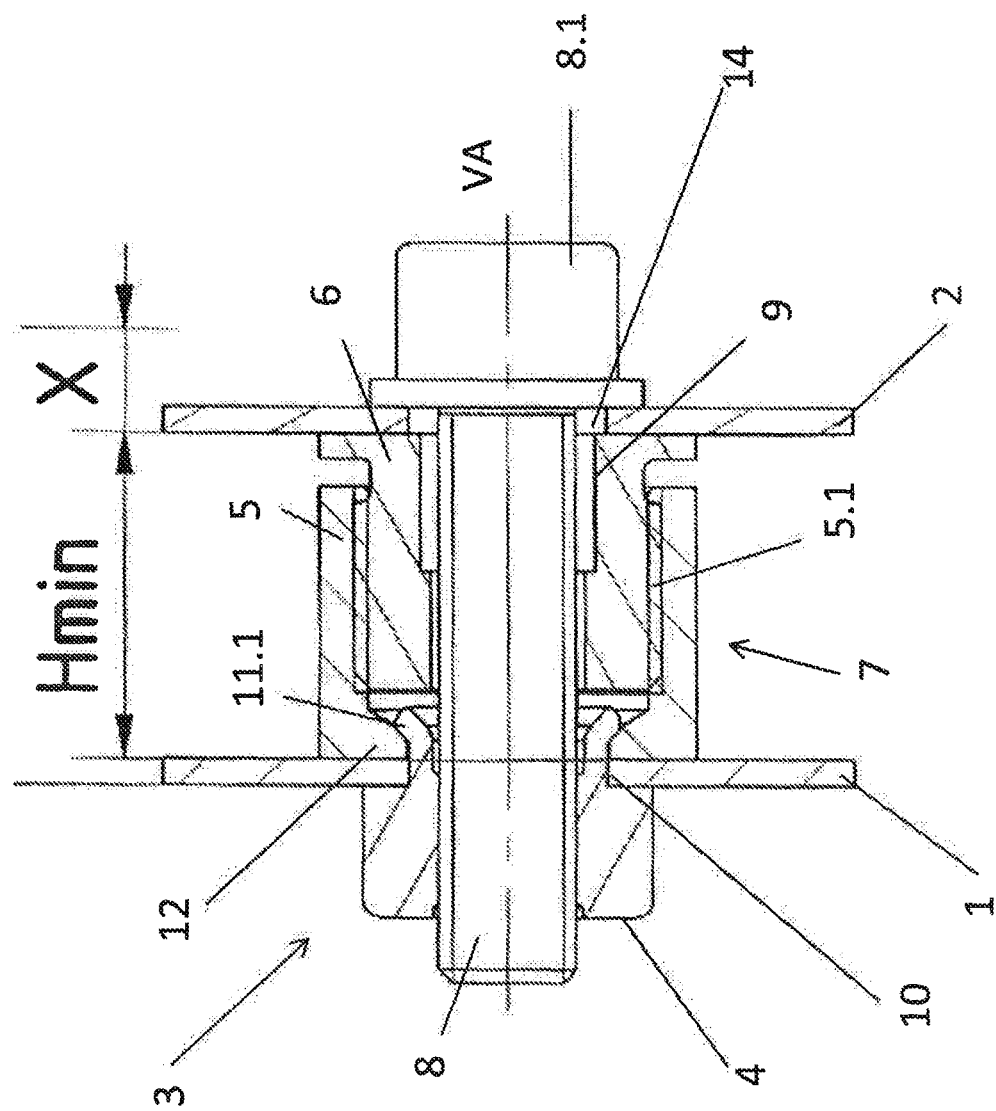
FIGS. 1 and 2 each show simplified sectional diagrams of different states of a device for clamping together first and second components with different spacings or with compensation of tolerances according to the invention.
Figure 2:
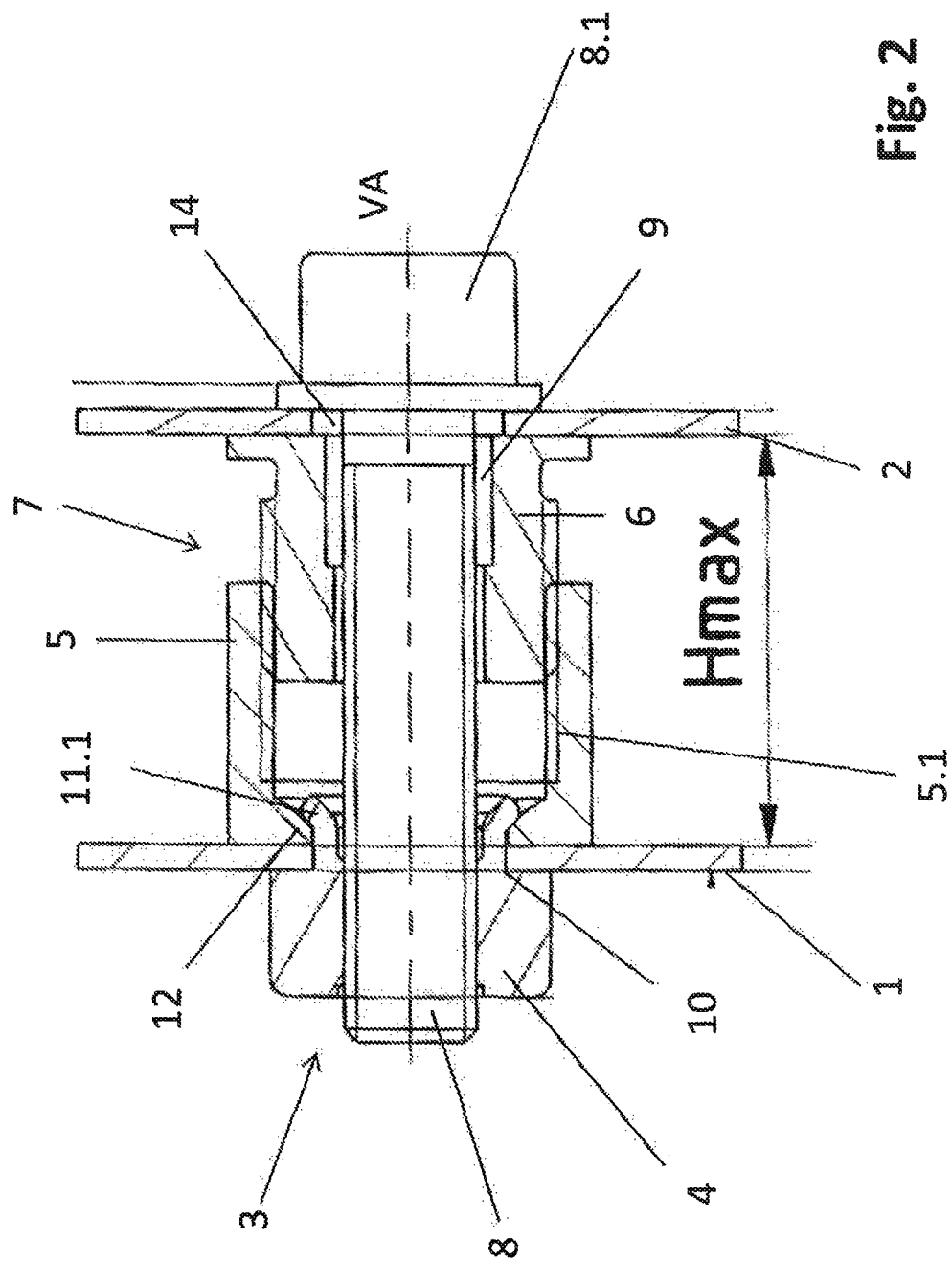

In the figures, components 1, 2 are produced from a flat metal material, for example from sheet steel, and are, for example, parts of a vehicle body. The components 1, 2 are clamped together by at least one device 3, in such a manner that they have a predefined distance H from each other. In detail, the device 3 is formed such that the first and second components 1, 2 can be clamped with a distance H from each other that lies in the range between a minimum distance Hmin and a maximum distance Hmax, depending on requirements. The distance H can be adjusted by the amount X, in particular also for axial compensation of tolerances, i.e. for compensation of tolerances in the direction of the axis VA of the device 3.

In detail, the device 3 comprises a clamping nut 4; a threaded sleeve or bushing 5 provided with an inner thread 5.1; and a drum nut 6. The outer thread of the drum nut 6 engages in the inner thread 5.1 of the threaded bushing 5 and which, together with the threaded bushing 5 forms an axially adjustable spacer 7. The device also includes a clamping or threaded bolt 8 with a head 8.1 that engages in the inner thread of the clamping nut 4. The clamping nut 4, the threaded bushing 5, the drum nut 6 and the threaded bolt 8 are arranged coaxially with each other and with the axis VA when the device 3 is mounted. Between the clamping bolt 8 extending through the opening in the drum nut 6, a driver bushing 9 is provided, which is produced for example from plastic and, as described in more detail below, first effects conjoint rotation of the drum nut 6 when the threaded bolt 8 is rotated about the axis VA, before the first and second components 1, 2 are clamped together using the threaded bolt. The outer thread of the threaded bolt 8 and the inner thread of the clamping nut 4 on one hand and the inner thread 5.1 of the threaded sleeve 5 and the outer thread of the drum nut 6 that interacts with the inner thread 5.1 on the other hand are threaded in opposite directions, i.e. the outer thread of the threaded bolt 8 and the inner thread of the clamping nut 4 are for example right-hand threads, while the inner thread 5.1 of the threaded bushing 5 and the outer thread of the drum nut 6 that interacts with the inner thread are left-hand threads.

The clamping nut 3 and the threaded bushing 5 are fastened to the component 1 in a joining opening 10 in the first component 1 in that a sleeve-like rivet collar 11, which is provided on the clamping nut 5 and extends through the joining opening 10, is folded down against an undercut 12, which is formed inside the threaded bushing 5, by permanent deformation, i.e. as a radially deformed rivet collar 11.1. To form the undercut 12, the opening in the threaded bushing 5 is such that it narrows in cross section towards the end face of the threaded bushing 5 that bears against the component 1, outside the inner thread 5.1.

Figure 3:
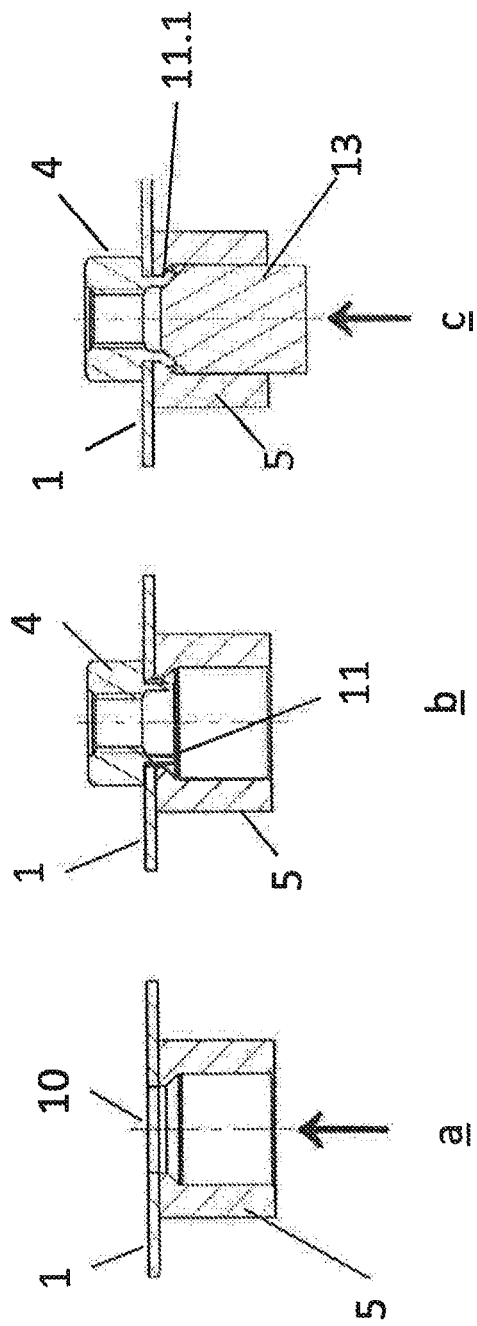
FIG. 3 shows a schematic diagram of different method steps for fastening a clamping nut and a threaded bushing of the device of FIGS. 1 and 2 to one of the components.

FIG. 3 shows essential method steps for connecting the first component 1 to the clamping nut 4 and the threaded bushing 5, i.e. first, the threaded bushing 5 is positioned on the first component 1 in the region of the joining opening 10 such that the opening in the threaded bushing 5 is aligned or substantially aligned with the joining opening 10 (position a). Then the rivet collar 11 of the clamping nut 4 is inserted from the side facing away from the threaded bushing 5 into the joining opening 10 and through the latter into the threaded bushing 5 (position b). With a suitable stamp-like tool 13, which is introduced into the threaded bushing 5, the non-deformed rivet collar 11 is then transformed into the deformed rivet collar 11.1, which engages behind the undercut 12, as a result of which the clamping nut 4 and the threaded bushing 5 are fixed to the first component 1 in a loss-proof manner. Then, for example, the drum nut 6 is screwed into the threaded bushing 5, completely or substantially completely, i.e. until an end of the drum nut 6 comes to bear against the undercut 12 or the folded down rivet collar 11.1. The drum nut 6 is already pre-mounted on the bushing 9. Then the second component 2 is placed on so that it bears against the end face of the drum nut 6 projecting out of the threaded bushing 5, and the threaded bolt 8 is then introduced from the side facing away from the clamping nut 4 through an opening 14 in the second component 2 at least into the drum nut 6 and is rotated in the sense of screwing into the clamping nut 4. First, conjoint rotation of the drum nut 6 takes place via the driver bushing 9 in such a manner that the drum nut is moved increasingly out of the threaded bushing 5 owing to the left-hand thread of the drum nut 6 and of the threaded bushing 5, and the distance H between the first and second components 1, 2 is also increased thereby until the required final distance H is reached and further change in the distance between the first and second components 1, 2 is no longer possible, for example by elements or components (not shown) that fix the final distance. Further rotation of the threaded bushing 8 then causes the threaded bushing 8 to be screwed increasingly into the clamping nut 4 and finally fixed clamping of the first and second components 1, 2 in that the threaded bushing 5, which is supported against the first component 1, and the drum nut 6, which is supported against the first component 1, form a rigid spacer between the first and second components 1, 2, and both first and second components 1, 2 are fixedly clamped together on their sides facing away from each other by the clamping bolt 8 or the head piece 8 thereof and the clamping nut 4.

The particular advantages of the device 3 reside in the fact that the clamping nut 4 and the threaded bushing 5 with the drum nut 6 can be pre-mounted on the first component 1, and the adjustment of the necessary distance H between the first and second components 1, 2 and the clamping of the first and second components 1, 2 together take place solely by inserting and rotating the clamping bolt 8 from the direction of the second component 2. It is therefore possible to provide the clamping nut 4 in a position that is no longer accessible or difficult to access subsequently when the first and second components 1, 2 are clamped together. The forces that effect clamping of the first and second components 1, 2 are therefore effective only via the clamping bolt 8, the head piece of which bears against the second component 2, and via the clamping nut 4, which bears against first component 1, and via the adjustable rigid spacer, which is formed by the threaded bushing 5 and the drum nut 6.

Figure 4:
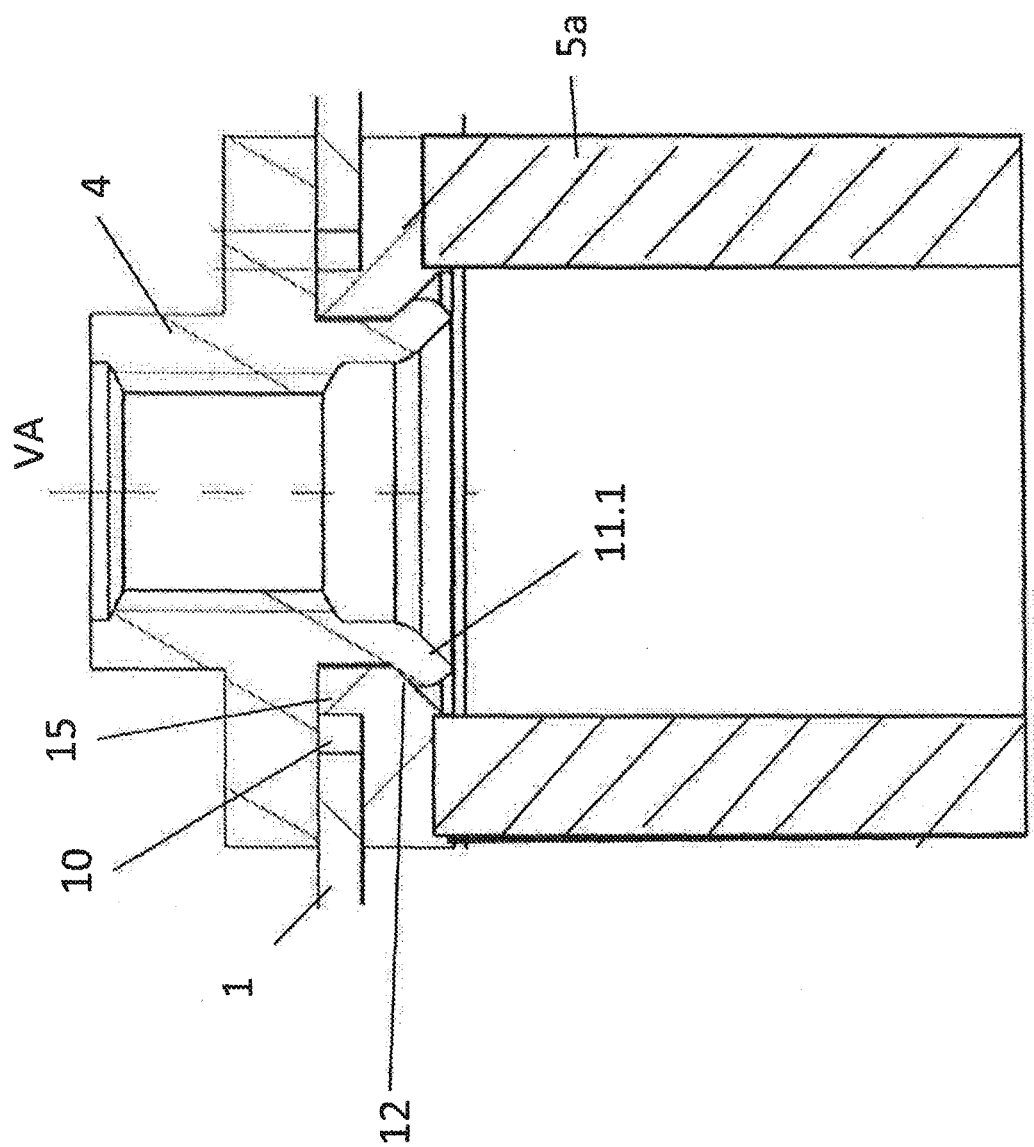
FIG. 4 shows a simplified sectional diagram of the clamping nut and the threaded bushing in a device according to the invention with lateral or radial compensation of tolerances.

It has been assumed above that axial adjustment of the distance H and axial compensation of tolerances is possible with the fastening device 3. FIG. 4 shows a simplified diagram of the arrangement formed by a clamping nut 4a and the threaded bushing 5, which also allows radial compensation of tolerances, i.e. compensation of tolerances radial to the axis AV. To this end, the threaded bushing 5a extends with a collar or section 15 into the joining opening 10. The collar or section 15 has a peripheral contour that deviates from the circular shape, for example a square peripheral contour. Analogous to this, the joining opening 10 is also formed with a cross section deviating from the circular shape, for example with a square cross section, the cross-sectional sides of which are however somewhat larger than the cross-sectional sides of the peripheral face of the section 15, so the threaded bushing 5 with the clamping nut 4 can be displaced in the plane perpendicular to the axis VA and therefore radial compensation of tolerances is possible. The cross section of the joining opening 10, that deviates from the circular shape, and the peripheral contour of the collar or section 15 that also deviates from the circular shape, ensure that the clamping nut 4 cannot rotate conjointly with the threaded bolt 8 when the first and second components 1, 2 are clamped together. The height that the collar or section 15 has in the direction of the axis VA is preferably somewhat greater than the thickness of the sheet forming the first component 1, so that when the clamping nut 4 and threaded bushing 5a are fastened to the component 1 (again by the deformed rivet collar 11.1), the clamping nut 4 of the threaded bushing 5a can be displaced for lateral or radial compensation of tolerances. The forces clamping the first and second components 1, 2 together are again effective only via the threaded bolt 8, the clamping nut 4 and the rigid spacer formed by the threaded bushing 5a and the drum nut 6.

Figure 5:
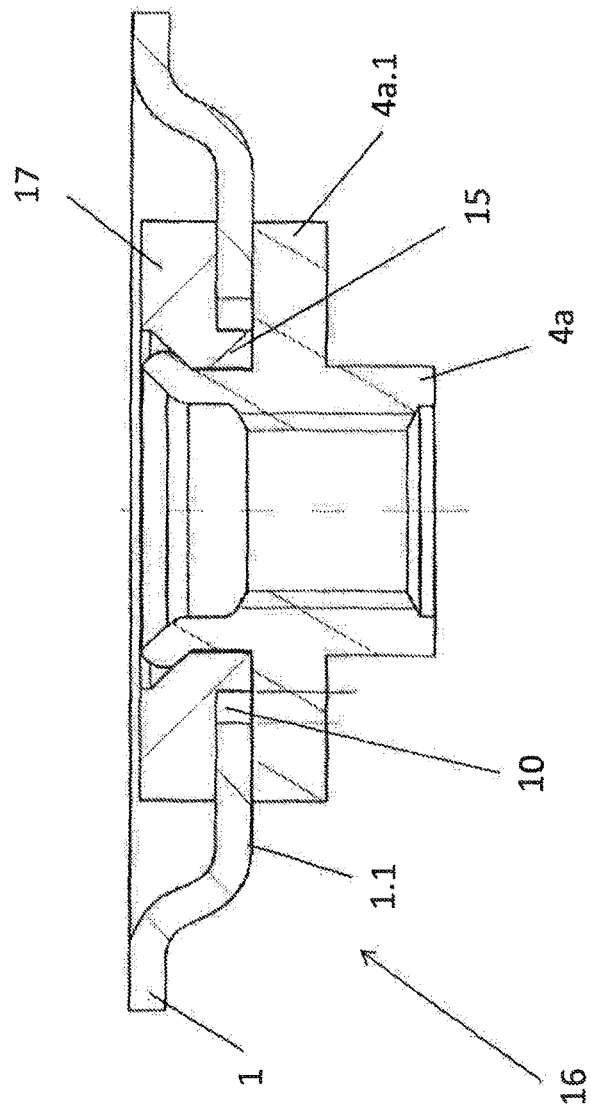
FIG. 5 shows a simplified sectional diagram of a clamping nut for lateral or radial compensation of tolerances.

FIG. 5 shows a nut arrangement 16, which allows lateral or radial compensation of tolerances and is composed of a clamping nut 4a and a retaining ring 17, which is held in the region of the joining opening 10 by the deformed rivet collar 11.1 of the clamping nut in the same manner as described above for the threaded bushing 5, 5a. The retaining ring 17 likewise has the undercut 12, behind which the deformed rivet collar 11.1 engages, and the collar or section 15, which extends into the joining opening 10 and has the peripheral contour deviating from the circular shape. The joining opening 10 is likewise formed with the cross section deviating from the circular shape, which is again greater than the outer cross section of the section 15, so compensation of tolerances is possible radially to the axis VA. As also shown in FIG. 5, the first component 1 is formed with a dome-like section 1.1 in the region of the clamping nut arrangement 16, in such a manner that the retaining ring 17 is completely held in the concave side of the dome-like section 1.1 and does not project beyond the plane in which the underside of the first component 1 that faces away from the clamping nut 4 is arranged outside the dome-like section 1.1. Furthermore, the first component 1 is held between the clamping nut 4a or a flange-like section 4a.1 of the nut and the retaining ring 17 in a region of the dome-like section 1.1 surrounding the joining opening 10.

The invention has been described above using exemplary embodiments. It is self-evident that numerous changes and modifications are possible without departing from the inventive concept on which the invention is based. For instance, another functional or connecting element that is provided with the rivet collar 11 can be fastened to the first component 1 with radial compensation of tolerances in the same manner as the clamping nut 4a.

LIST OF REFERENCE SYMBOLS

1 First component
2 Second component
1.1 Dome-like section
3 Fastening device
4, 4a Clamping nut
5, 5a Threaded bushing
5.1 Inner thread
6 Drum nut
7 Spacer
8 Threaded or clamping bolt
8.1 Bolt head
9 Driver bushing
10 Joining opening
11 Rivet collar
12 Undercut
13 Tool
14 Opening
15 Section or collar
16 Clamping nut arrangement
17 Retaining ring
VA Axis of fastening device

The invention claimed is:

1. A method for producing an assembly, the assembly comprising a first component and a second component, the first component and the second component are clamped together at a predefined distance (H) from each other, the first component and the second component being clamped together using a clamping nut that bears against the first component on an outer face of the first component that faces away from the second component, using a clamping bolt which engages in the clamping nut and bears against the second component on an outer face of the second component that faces away from the first component, and using an adjustable spacer formed by a threaded bushing and a drum nut between the first component and the second component, wherein the method comprises the steps of:
   (i) screwing the threaded bushing into the clamping nut before or while the clamping bolt passes through the drum nut, the distance (H) between the first component and the second component being first set with conjoint rotation of the drum nut and then,
   (ii) further screwing the clamping bolt into the clamping nut, the first component and the second component are thereby clamped against each other, whereby the clamping nut and the threaded bushing are fixed on the first component by a permanently deformed rivet collar, which passes through a joining opening in the first component and engages behind an undercut in the threaded bushing.

2. The method according to claim 1, further comprising the step of:
   (iii) inserting the drum nut into the threaded bushing after the clamping nut and the threaded bushing have been fixed.

3. The method according to claim 1, whereby when the inner thread of the threaded bushing and the outer thread of the drum nut, which interacts with the inner thread, are formed in an opposite direction to the outer thread of the clamping bolt and the inner thread of the clamping nut, rotation of the clamping bolt in the sense of screwing into the clamping nut first increases the distance (H) between the first component and the second component up to a necessary distance (H), and after the necessary distance (H) has been reached, the first component and the second component, which are supported on the adjustable spacer, are clamped together by the clamping bolt engaging in the clamping nut.

4. The method according to claim 1, whereby in addition to an axial adjustment of the distance (H) between the first and the second components or in addition to an axial compensation of tolerances, a lateral or radial compensation of tolerances takes place by moving the clamping nut and the threaded bushing held with the deformed rivet collar in an enlarged joining opening, a cross section of the enlarged joining opening deviating from a circular shape and a peripheral contour of the rivet collar that passes through the enlarged joining opening or of a collar or section of the threaded bushing that extends into the enlarged joining opening deviates from the circular shape.

5. A method for fastening a connecting element, a form of a nut, or a threaded bolt to a joining opening provided in a first flat material component by permanent deformation of a rivet collar, which is provided on the connecting element and passes through the first flat material component in a region of the joining opening, into a deformed rivet collar, whereby for lateral or radial compensation of tolerances on a side of the first flat material component facing away from the connecting element, a retaining ring is provided, a section or collar for the retaining ring extends into the joining opening, and forms an undercut in a ring opening, the method comprising the step of:

(i) deforming the rivet collar introduced into the ring opening of the retaining ring that engages behind the undercut, and that the joining opening is produced with a cross section that is greater than an outer cross section of the section or collar of the retaining ring that extends into the joining opening.

6. The method according to claim 5, wherein the joining opening has a cross section that deviates from a circular shape and the section or collar that extends into the joining opening has a peripheral contour that deviates from the circular shape.

7. The method according to claim 5, wherein the section or collar that extends into the joining opening has a height in an axial direction parallel to the axis of the joining opening that is greater than a wall thickness that the first flat material component has in the region that surrounds the joining opening and is held between the connecting element and the retaining ring.

8. The method according to claim 5, the first flat material component is formed in the region of the joining opening with a dome section, which on the concave side thereof at least partially holds the retaining ring.

9. An assembly composed of a first flat material component and a second flat material component that are spaced apart from each other and clamped together with a fastening device, wherein the fastening device has a clamping nut, the fastening device bears against the first flat material component on an outer face of the first flat material component that faces away from the second flat material component, a clamping bolt, which bears against the second flat material component on an outer side of the second flat material component that faces away from the first flat material component, and an adjustable spacer, against which the first flat material component and the second flat material component are supported with mutually facing sides thereof and which is composed of a threaded bushing, which bears against an inner side of the first flat material component and has an inner thread and a drum nut, an outer thread of which engages in an inner thread and against which the inner side of the second flat material component bears, wherein the clamping bolt passes through first and second openings in the first and second flat material components and through a spacer, whereby the clamping nut is formed with a sleeve rivet collar, which projects beyond an end face of the drum nut that faces the first flat material component, and passes through the joining opening in the first flat material component and extends into the threaded bushing and is deformed by permanent deformation into a deformed rivet collar that engages behind an undercut in the threaded bushing.

10. The assembly according to claim 9, further comprising a driver bushing provided between the clamping bolt and the drum nut.

11. The assembly according to claim 9, wherein the inner thread of the threaded bushing and the outer thread of the drum nut are formed in an opposite direction to the thread of the clamping bolt and the clamping nut, and wherein the inner thread of the threaded bushing and the outer thread of the drum nut are left-handed threads and the threads of the clamping nut and of the clamping bolt are right-handed threads.

12. The assembly according to claim 9, wherein for radial compensation of tolerances, the first and/or the second opening in the first flat material component and/or in the second flat material component is greater than an outer cross section of the rivet collar that passes through the joining opening in the first flat material component or of a section of the threaded bushing that extends into the joining opening in the first flat material component and/or than the outer cross section of the clamping bolt.

\* \* \* \* \*